US011477249B2

(12) United States Patent
Itoi et al.

(10) Patent No.: US 11,477,249 B2
(45) Date of Patent: Oct. 18, 2022

(54) SECURITY GUIDANCE FOR CREATION OF MULTI FACTOR AUTHENTICATION POLICY

(71) Applicant: Okta, Inc., San Francisco, CA (US)

(72) Inventors: Naomaru Itoi, Fremont, CA (US); Sam Sanjabi, Toronto (CA); Royal Chan, Alameda, CA (US); Vincent Voong, San Francisco, CA (US); Daniel Jeffrey Post, Pacifica, CA (US); Cedric Beust, Sunnyvale, CA (US)

(73) Assignee: Okta, Inc., San Francisco, CA (US)

( * ) Notice: Subject to any disclaimer, the term of this patent is extended or adjusted under 35 U.S.C. 154(b) by 108 days.

(21) Appl. No.: 17/163,084

(22) Filed: Jan. 29, 2021

(65) Prior Publication Data

US 2022/0247789 A1 Aug. 4, 2022

(51) Int. Cl.
*H04L 9/40* (2022.01)
*G06F 3/04847* (2022.01)
*G06F 3/0482* (2013.01)

(52) U.S. Cl.
CPC .......... *H04L 63/205* (2013.01); *G06F 3/0482* (2013.01); *G06F 3/04847* (2013.01); *H04L 2463/082* (2013.01)

(58) Field of Classification Search
CPC ............. H04L 63/205; H04L 2463/082; G06F 3/0482; G06F 3/04847
See application file for complete search history.

(56) References Cited

U.S. PATENT DOCUMENTS

| 9,178,858 B1 | 11/2015 | Mussman et al. |
| 2002/0138574 A1 | 9/2002 | Brown et al. |
| 2010/0024019 A1* | 1/2010 | Backlund ............. G06F 21/335 707/E17.005 |
| 2012/0284779 A1* | 11/2012 | Ingrassia, Jr. ......... H04W 12/08 726/5 |
| 2016/0232493 A1 | 8/2016 | Bonda et al. |
| 2019/0089831 A1 | 3/2019 | Medlen et al. |
| 2019/0287094 A1* | 9/2019 | Fisher ................. G06Q 20/354 |
| 2021/0334520 A1* | 10/2021 | Umeda ............... G06V 10/751 |

FOREIGN PATENT DOCUMENTS

KR 10-2018-0109618 A 10/2018

OTHER PUBLICATIONS

PCT International Search Report and Written Opinion, PCT Application No. PCT/US2022/013750, dated May 4, 2022, 12 pages.

\* cited by examiner

*Primary Examiner* — Jennifer N Welch
*Assistant Examiner* — Ashley M Fortino
(74) *Attorney, Agent, or Firm* — Fenwick & West LLP (57) ABSTRACT

An identity provider ("IdP") system maintains a framework of authentication methods and security targets that enables flexible authentication policy authoring and analysis of authentication performed by users of an organization. The IdP system generates authentication method profiles that include authentication factors and attributes, which may be further classified as required or optional. The IdP system also generates security target profiles that indicate security requirements needed to satisfy the corresponding security targets. The IdP system uses the generated profiles to determine relationships between authentication methods and security targets (e.g., a list of authentication methods that satisfy a given security target). Using these relationships, the IdP system may enable users to author policies and analyze how users' authentication behaviors comply with security targets.

20 Claims, 6 Drawing Sheets

SECURITY GUIDANCE FOR CREATION OF MULTI FACTOR AUTHENTICATION POLICY

FIELD OF ART

The present invention generally relates to the field of software systems, and more specifically, to authoring and analyzing identity authentication policies.

BACKGROUND

An organization using multi-factor authentication may have varying needs depending on users or accounts that are associated with the authentication. Users of computer systems within organizations typically have multiple accounts with different independent systems, such as various third-party applications and/or websites, with different credentials (e.g., username and password) for each. Users authenticate their identities separately for each of their separate accounts in order to access their resources on those accounts. A manner in which a user authenticates the user's identity to access certain resources, or an "authentication method," may vary depending on the security requirements needed to access those resources. These security requirements may be customized at each organization or regulated by an industrial standard, and often change over time to adapt to increasingly advanced security threats. Accordingly, organizations continuously manage their authentication methods to ensure that their resources are secure or that security requirements are met. Furthermore, organizations are increasingly incentivized to employ a diverse variety of authentication methods that reflect the authentication requirements of a user's separate accounts (e.g., ease of use for the user). However, with varying combinations of authentication methods that may meet one set of security requirements but not others and security requirements that change over time, managing authentication that can be tailored to an organization's custom needs can be challenging.

SUMMARY

To address these challenges, users may entrust a separate identity provider ("IdP") system with both their credentials for authenticating themselves on their various third-party accounts on different systems and managing the authentication methods that they employ. The IdP system may facilitate the authentication of the user across the various accounts and systems using those credentials. Additionally, the IdP system may maintain a flexible data framework for modeling authentication methods (e.g., passwords, biometrics, etc.) and security targets (e.g., Authenticator Assurance Level guidance) that can be leveraged to determine relationships between the methods and targets. The relationships identified between high level concepts such as security targets and low level concepts such as authentication methods, in turn, allow organization administrators to consider a variety of authentication methods and the many combinations thereof to determine those that satisfy security requirements that may vary organization to organization.

The IdP system may use this framework to author authentication policies and analyze the consumption of those policies. In particular, the IdP system allows users the flexibility to query for relationships between authentication methods and security targets (e.g., a relationship between a security target and the authentication methods that satisfy the target's requirements) using either security targets or authentication methods. For example, an administrator wishing to formulate an authentication policy can query the IdP system for a security target that can be met with a specified set of authentication methods, avoiding certain authentication methods that the administrator's organization cannot employ. Additionally, the administrator can specify a security target tailored to the organization and the IdP system accordingly generates a profile for the customized security target to be included in the flexible data framework. The IdP system may use the data framework to track when, for example, the specified set of authentication methods are performed and generate compliance reports showing how often security targets are met. Accordingly, the IdP system provides authentication policy guidance that is flexible to an organization's needs and assists with both the authoring of policies and analysis of how those policies are used.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
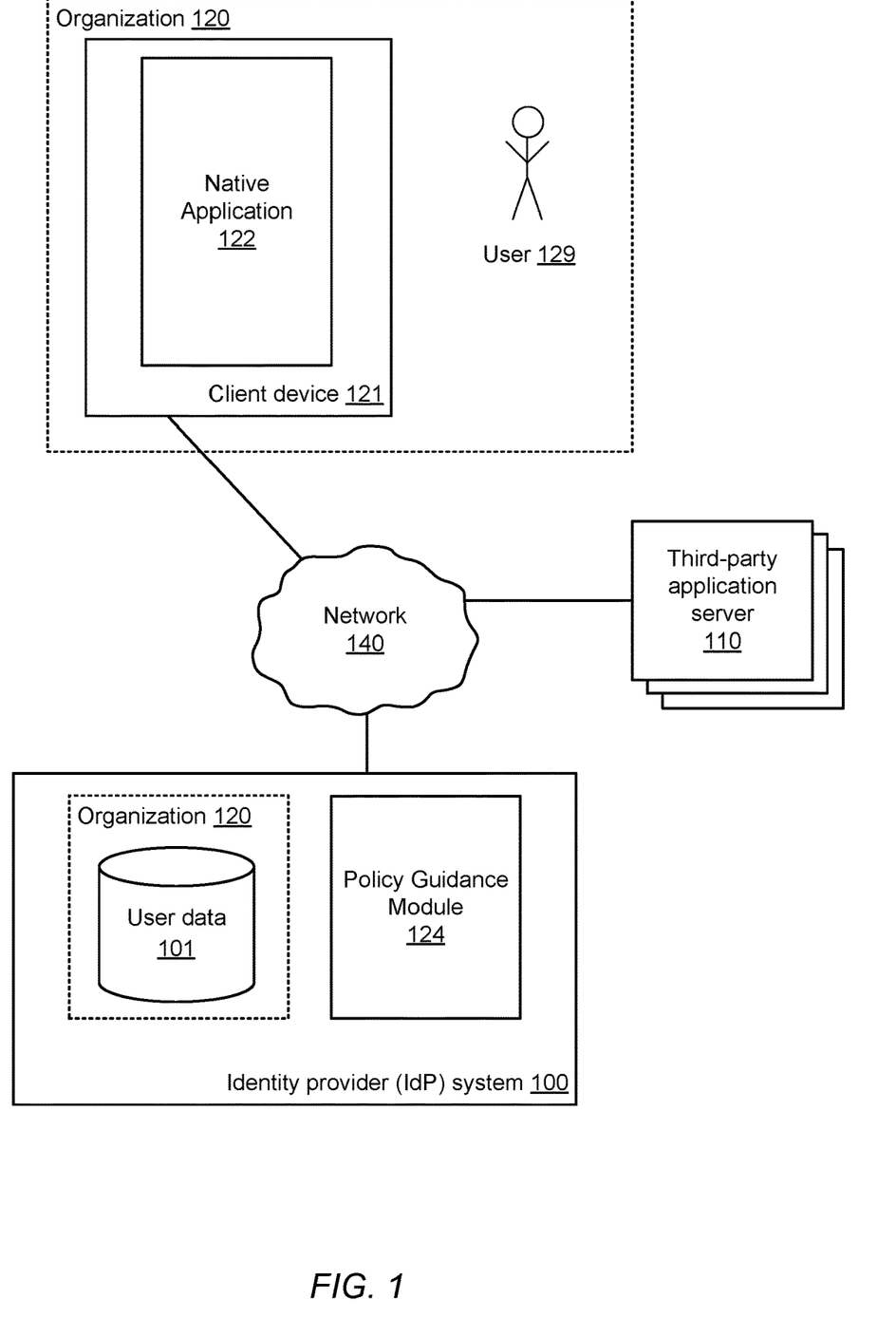
FIG. 1 illustrates one embodiment of a computing environment in which a policy guidance module on a client device is used to manage authentication policies.

FIG. 1 illustrates one embodiment of a computing environment in which users use a client computing device to accomplish tasks on multiple different accounts. The users may be affiliated with an organization (e.g., employees or volunteers of the organization) and may accomplish the tasks on behalf of the organization. The users may have multiple accounts on different systems, and the systems may be owned and/or administered by different independent entities, such that the users may have a number of different identities—and corresponding credentials—across the different systems. The different accounts may provide the users with access to different resources, such as (for example) applications (e.g., email applications, timekeeping applications, spreadsheet applications, etc.), databases, files systems, or the like. Such applications 110 could be, for example, entirely web-based and accessible through a web browser, or could be accessible through a native application installed on the user's client device and communicating with a remote application server. Since each application or other resource could be from a different provider—each of which could have a different identity for a user—a single user will typically have many different identities and associated credentials corresponding to the different resources that the user uses. FIG. 1 illustrates one such possible resource: an application partially or entirely implemented via a third-party application server 110. An identity provider (IdP) system provides users with a federated identity integrating the users' different identities on different accounts, thereby providing more convenient, efficient, and secure access to the different accounts. These entities are now described in more detail.

The organization 120 is an entity, such as a business, a school, a governmental agency, or the like, that has a number of affiliated users 129, such as employees or volunteers. The organization also has one or more client devices 121 that the users 129 use to perform tasks on behalf of the organization. In other embodiments, the users are not affiliated with an organization, but instead act independently using client devices 121 belonging to them.

The identity provider system (IdP system) 100 provides the user 129 with a federated identity linking the various identities of the user on the different accounts (e.g., the third-party applications 110) or other resources to which the user has access. The IdP system 100 stores user data 101 that include a set of identities of known users with accounts on the IdP system 100. The user data 101 may include a form of identity on the IdP system 100 such as a username, as well as other credential data associated with a user, such as a user password or information derived therefrom. The user data 101 may also include many other types of data about users, such as the factor types and providers that they may use when seeking identity verification from the IdP system 100, their role(s) or group(s) within the organization 120 to which they belong (e.g., "Engineering", "Legal", "Manager 2", "Director", or the like), and/or the resources to which they have access (e.g., third-party applications 110 such as SALESFORCE, MICROSOFT OFFICE 365, SLACK, or the like), as some examples. The user data 101 may also include identities and credentials of the various users on the various accounts to which they have access, thereby linking a user's identity on the IdP system 100 to the user's identities on those different accounts and (by extension) permitting access to those accounts. In some embodiments, the IdP system 100 is part of the organization 120, rather than being an independent entity as it is in other embodiments.

Software on the client device 121 facilitates providing users with federated identities by securely and transparently communicating with the IdP system 100 that handles the details of identity federation and provides related identity services. In this way, the users of the organization 120 simply and securely obtain access to the various third-party accounts or other resources that they need to complete tasks on behalf of the organization. The software on the client device 121 that communicates with the IdP system may (although need not) be provided by the entity responsible for the IdP system 100.

In some embodiments, the IdP system 100 includes single sign-on (SSO) functionality that allows the IdP system to transparently log a user in to the different accounts or other resources to which the user has access. For example, for a given user who has logged in to the IdP system 100, the IdP system can look up the user's accounts or other resources within the user data 101, as well as the user's credentials for those accounts. Using the credentials, as well as metadata or other information about the accounts, IdP system 100 can automatically log the user into the applications or other resources described in the user data 101, such as by establishing application sessions with the various applications and providing corresponding session data (e.g., session tokens) to the device 121. Thus, with a single login to the IdP system 100, the SSO functionality of the IdP system provides a user with automatic access to all the user's accounts or other resources.

In some embodiments, a client device 121 includes a number of components that a user 129 can use to accomplish tasks via applications or other resources, or that interface with the IdP system 100 in order to provide federated identities, SSO functionality, and/or other functionality. These components are now described in more detail.

The client device 121 may include a native application 122, which is a locally-installed application that communicates with a third-party application server 110 to provide application functionality, such as an email application, a chat application, an accounting application, or the like. For example, the native application 122 may provide the user interface for the application and communicate with its corresponding third-party application server 110 to access the user's data to display within the user interface. Alternatively, a given application may not be installed locally on the client device 121, but rather may be downloaded and executed entirely within a web browser on the client device 121, for example. (The terms "application 110", "application 122", or simply "application" are sometimes used interchangeably herein to general denote functionality of the application, whether it is implemented entirely on the application server 110, or partially on the application server 110 and partially via the native application 122.)

The IdP system 100 also includes a policy guidance module 124 that enables policy authority guidance and analysis of policy compliance. For example, the client device 121 may access the functionality of the policy guidance module 124 remotely located at the IdP system 100 through the network 140. Although shown as a component of the IdP system 100, the policy guidance module 124 may be located additionally or alternatively at the client device 121.

The policy guidance module 124 may generate and maintain profiles (e.g., data structures) used to author policies and analyze how the authored policies have been consumed. The profiles may be used to author a policy. For example, based on an organization's desired or available authentication methods, the policy guidance module 124 may reference the profiles of the authentication methods and security targets to determine a security target satisfied by the organization's authentication methods. The profiles may be used to analyze how users consume authored policies. For example, the interactions of the user 129 with the client device 121 to authenticate itself to the IdP system 100 are logged and cross-referenced against authentication method profiles to track the usage of authentication methods and how often certain security targets are met (e.g., security target compliance). The policy guidance module 124 may provide a graphical user interface (GUI) for display that allows a user to easily author policies and analyze their consumption.

The policy guidance module 124 may generate profiles of authentication methods and security targets according to information specified by an administrator of the organization 120, the third-party application server 110, the IdP system 100, an international standard for cybersecurity, or a combination thereof. As referred to herein, an "administrator" may be a user of an organization who is authorized to manage authentication policies or a personnel associated with the IdP system 100 who is authorized on behalf of the organization to manage the organization's authentication policies. Alternatively or additionally, the policy guidance module 124 may receive profiles (e.g., from the IdP system 100 or the third-party application server 110). The profiles may be data structures that model authentication methods or security targets. The data structures may use formats such as JavaScript Object Notation (JSON), Extensible Markup Language (XML), or any other suitable data format for storing or transmitting data. The profiles may indicate authentication factors ("factors") or authentication attributes ("attributes") corresponding to optional or required authentication mechanisms that characterize an authentication method or security target.

Authentication methods that users choose to authenticate themselves with may meet optional or required factors and attributes. Which factors or attributes are satisfied depend on the manners through which users choose to authenticate themselves. In one example, an organization may author a policy including an authentication method that requires a password and gives users an option to authenticate themselves through a fingerprint. In this example, the corresponding authentication method profile includes a required factor of "knowledge" and required attribute of a minimum length for the password, which are both satisfied if the user chooses to authenticate himself using a password. This profile also includes an optional factor of "inherence" and an optional attribute of a minimum number of minutiae points for the sensed fingerprint, which may be satisfied if the user chooses to authenticate himself using his fingerprint. In some embodiments, an organization may require users authenticate themselves in a manner that satisfies required factors and attributes initially and subsequently allow users to perform authentication in a way that satisfies optional factors and attributes.

Examples of factors include knowledge, possession, and inherence. "Knowledge" refers to what a user knows, "possession" refers to what a user physically has, and "inherence" refers to what the user is. Examples of authentication methods that satisfy the "knowledge" factor include a password or security questions, which are both examples of information that a user knows. Examples of authentication methods that satisfy the "possession" factor includes a security token or a push notification on a mobile device ("mobile app push"), which are both examples of a hardware device that a user physically possesses. An example of an authentication method that satisfies the "inherence" factor is a biometric such as fingerprints or facial recognition, which are examples of features that a user possesses inherently.

Attributes of a profile may be used to describe an authentication method. As used in the profiles, attributes may be represented as name/value pairs where the name describes the attribute and the value describes the state or condition of the attribute. Examples of attribute names include "dedicated hardware," "proof of possession," "verifier impersonation resistance," or "minimum length." Examples of attribute values include a binary flag indicating whether the attribute is applicable for a given authentication method or a description of a condition such as "greater than or equal 8" corresponding to the minimum length required of a password. In one example, an attribute with the name "proof of possession" may have a value of "true," referring to a requirement that the user have possession of hardware to authenticate (e.g., a security token or responding to a push notification on a mobile device). In another example, an attribute with the name "minimum length" may have a value of "12," referring to a string length of at least twelve characters needed as knowledge to authenticate the user to the IdP system 100.

An authentication method profile generated by the policy guidance module 124 may be a JSON object having name/value pairs such as an identification number for the authentication method, a name of the authentication method, a flag indicating whether the authentication method is currently enabled for use in authentication (e.g., by the organization 120), required factors, optional factors, required attributes, and optional attributes. An authentication method may be a method by which a user authenticates his or her identity to an organization (e.g., using the IdP system 100). Authentication methods include passwords, biometric identification (e.g., fingerprint, voice recognition, face recognition, etc.), security tokens, a notification with a security code sent via short message service (SMS) or phone call, security questions, personal identification numbers, a time-based one-time password (TOTP), any suitable identity authentication mechanism, or combination thereof.

In a first example, a password authentication method may be modeled by name/value pairs indicating the identification information such as its ID and name, whether the method is enabled (e.g., an enabled status), and the factors and attributes describing the authentication method. An example JSON structure corresponding to this first example is shown in Table 1.

```
{
  "id":"01",
  "name":"Password",
  "enabled":true,
  "factors":[
    "knowledge"
  ],
  "attributes":[
    {
      "min_length":6
    }
  ]
}
```

Table 1 Example JSON Structure for a Password Authentication Method

In a second example, a security key authentication method may be modeled by name/value pairs that include optional factors and attributes describing the authentication method. An example JSON structure corresponding to this second example is shown in Table 2.

```
{
  "id":"02",
  "name":"security_key",
  "enabled":true,
  "factors":[
    "possession"
  ],
  "optional factors":[
    "inherence"
  ],
```

```
"attributes":{
"dedicated_hardware":true,
"proof_of_possession":true
},
"optional attributes":{
"verifier_impersonation_resistance":true
}
}
```
Table 2 Example JSON Structure for a Security Key Authentication Method A security target profile generated by the policy guidance module 124 may be a JSON object having name/value pairs such as a number indicating a required number of factors necessary to satisfy the security target and a list of attributes necessary to satisfy the security target. As referred to herein, a "security target" may be a collection of one or more required authentication mechanisms. A required authentication mechanism may be referred to herein as a "security requirement." The security targets may be a standardized security target such as the Authenticator Assurance Level 1 (AAL1), AAL2, or AAL3 security targets set by the National Institute of Standards and Technology (NIST). The security target may be a form of multi-factor authentication such as three-factor authentication (3FA). In some embodiments, an organization may define a custom security target. For example, the organization 120 may define a security target requiring two-factor authentication (i.e., two is the number of required factors) with a password policy having attributes that the password length must be a minimum of twelve characters and that passwords must be changed every ninety days or less.

In a first example, a security target profile for AAL2 may be modeled by name/value pairs indicating that the number of factors necessary to satisfy AAL2 is two factors (i.e., two-factor authentication) and that an attribute for "proof of possession" must be enabled. An example JSON structure corresponding to this first example is shown in Table 3.
```
{
   "num factors":2,
   "attributes":{
      "proof_of_possession":true
   }
}
```
Table 3 Example JSON Structure for an AAL2 Security Target In a second example, a security target profile for AAL3 may be modeled by name/value pairs indicating that the number of factors necessary to satisfy AAL3 is two factors, and that attributes of "dedicated hardware," "proof of possession," and "verifier impersonation resistance" must be enabled. An example JSON structure corresponding to this second example is shown in Table 4.
```
{
   "num factors":2,
   "attributes":{
      "dedicated_hardware":true,
      "proof_of_possession":true,
      "verifier_impersonation_resistance":true
   }
}
```
Table 4 Example JSON Structure for an AAL3 Security Target The policy guidance module 124 may use the generated profiles to determine relationships between authentication methods and security targets. The relationships may include a relationship between one or more authentication methods and the security targets they meet (i.e., the requirements of the security targets are satisfied by the one or more authentication methods) or similarly, one or more security targets and the authentication methods that can be used to meet the targets. The determined relationships may be used to author policies and analyze how the users of an organization comply with security targets. The policy guidance module 124 may determine these relationships in various manners. Four examples of algorithms for determining a relationship between authentication methods and security targets are described herein.

In a first algorithm for determining a relationship between authentication methods and security targets, the policy guidance module 124 determines a set of authentication methods that satisfies a security target, T. In particular, the first algorithm uses the required factors and attributes of available authentication methods, without relying on the optional factors and attributes, to determine the set of authentication methods that will satisfy the requirements of the security target T. The policy guidance module 124 generates possible combinations of N methods, where N represents the number of required of factors necessary to satisfy the security target T. For each combination, C, in the possible combinations of N methods, the policy guidance module 124 determines whether the total number of unique factors in combination C, excluding optional factors, meets requirement N. If combination C does not meet the requirement of N factors, the policy guidance module 124 will remove it from its consideration (e.g., removing it from a list that the policy guidance module 124 has created of the possible combinations). Furthermore, for each combination C in the possible combinations of N methods, the policy guidance module 124 determines whether the collective attributes within combination C, excluding optional attributes, satisfies the list of attributes required by security target T. This determination may be a Boolean check or an operation comparing non-Boolean values of name/value pairs. For example, an attribute where a password must be a minimum of twelve characters long does satisfy a security target's required attribute where a password must be a minimum of eight characters long. Sample pseudocode for the first algorithm is shown in Table 5.

Combinations=all possible combinations of N methods, where N=S.num_factors;
for C in combinations:
    AM=all Methods in C
    If factors in AM does not have N unique factors, remove C from the list. (a)
    If attributes in AM does not satisfy all of T.attributes, remove C from the list. (b)
If there are any combinations left in Combinations, return them.
Otherwise, return null.

Table 5 Sample Pseudocode for the First Algorithm

In a second algorithm for determining a relationship between authentication methods and security targets, the policy guidance module 124 determines a set of authentication methods that sometimes satisfies a security target. In particular, the second algorithm uses both the required and optional factors and attributes of available authentication methods to determine the set of authentication methods that will satisfy the requirements of a security target. The policy guidance module 124, similar to the first algorithm, generates possible combinations of N methods, where N represents the number of required of factors necessary to satisfy the security target T. For each combination, C, in the possible combinations of N methods, the policy guidance module 124 determines whether the total number of unique factors in combination C, including optional factors, meets requirement N. If combination C does not meet the requirement of N factors, the policy guidance module 124 will remove it from its consideration. The policy guidance module 124 then determines, for each combination C in the possible combinations of N methods, whether the collective attributes within combination C, including optional attributes, satisfies the list of attributes required by security target T. Sample pseudocode for the first algorithm is shown in Table 6.

Combinations=all possible combinations of N methods, where N=S.num_factors;
for C in combinations:
    AM=all Methods in C
    If factors and optional_factors in AM does not have N unique factors, remove C from the list. (a)
    If attributes and optional_attributes in AM does not satisfy all of T.attributes, remove C from the list. (b)
If there are any combinations left in Combinations, return them.
Otherwise, return null.
Table 6 Sample Pseudocode for the Second Algorithm In a third algorithm for determining a relationship between authentication methods and security targets, the policy guidance module 124 determines whether a list of authentication methods satisfies a security target, T. In particular, the third algorithm uses the required factors and attributes within the list of authentication methods, without relying on the optional factors and attributes, to determine whether the security target T is satisfied by the list of authentication methods. The policy guidance module 124 may iterate through each method, M, in the list of authentication methods to determine whether a required attribute of M satisfies a required attribute of T. Additionally, with each iteration through a method M, the policy guidance module 124 may track the number of unique, required factors that the list of authentication methods collectively contains. For example, the policy guidance module 124 initializes a list to track factors and for each method M, if a required factor within the profile of M is not in the list, adds the required factor to the list. After iterating through each M, the policy guidance module 124 determines if the security target T's required number of factors and required attributes have been satisfied by the list of authentication methods. If the list does satisfy the requirements of target T, the policy guidance module 124 may indicate (e.g., via a GUI on the client device 121) that target T can be met by the list of authentication methods. Otherwise, if the list does not satisfy the requirements of target T, the policy guidance module 124 may similarly provide an appropriate notification to the user. Sample pseudocode for the first algorithm is shown in Table 7.

sum_of_factors=[ ]
sum_of_attributes=[ ]
for M in all Methods in the list:
    If M.factor is not in sum_of_factors, add M.factor to sum of factors. (a)
    If M.attributes includes an attribute that is not in sum_of_attributes, add it to sum_of_attributes. (b)
If length(sum_of_factors)<S.num_factors:
    return false
If sum of attributes has enough attributes to satisfy all of S.attributes:
    return true
else:
    return false
Table 7 Sample Pseudocode for the Third Algorithm In a fourth algorithm for determining a relationship between authentication methods and security targets, the policy guidance module 124 determines whether a list of authentication methods sometimes satisfies a security target, T. In particular, the fourth algorithm uses both required and optional factors and attributes within the list of authentication methods to determine whether the security target T is satisfied by the list of authentication methods. Similar to the third algorithm, the policy guidance module 124 iterates through each method M in the list of authentication methods to tally the total number of unique factors among both the required and optional factors. The policy guidance module 124 also checks whether the required and optional factors of the methods in the list collectively meet the attributes required by security target T. If the list of authentication methods has a unique number of factors that satisfies the factor requirement of target T and the attributes that also satisfies the attribute requirement of target T, the policy guidance module 124 will provide an indication that security target T can be met by the list of authentication methods. Otherwise, the policy guidance module 124 will provide an indication that the security target T cannot be met by the list of authentication modules. Sample pseudocode for the first algorithm is shown in Table 8.

sum_of_factors=[ ]
sum_of_attributes=[ ]
for M in all Methods in the list:
    If M.factor is not in sum_of_factors, add M.factor to sum of factors. If M.optional_factor is not in sum_of_factors, add M.optional_factor to sum_of_factors. (a)
    If M.attributes includes an attribute that is not in sum_of_attributes, add it to sum_of_attributes. If M.optional_attributes includes an optional attribute that is not in sum_of_attributes, add it to sum_of_attributes. (b)
If length(sum_of_factors)<S.num_factors:
    return false
If sum_of_attributes has enough attributes to satisfy all of S.attributes:
    return true
else:
    return false
Table 8 Sample Pseudocode for the Fourth Algorithm In some embodiments, the third and fourth algorithms may be used to determine which security targets are satisfied by the list of authentication methods. For example, the policy guidance module 124 iterates through each security target T (e.g., each security target profile) of available security targets to determine which security targets are satisfied by the list of authentication methods. To improve the performance of the algorithms used by the policy guidance module 124 to determine relationships between authentication methods and security targets, the policy guidance module 124 may cache inputs and outputs of the algorithms. For example, the policy guidance module 124 may store an input of a particular list of authentication methods and a security target that the list may or may not satisfy and store an output of a Boolean flag indicating that the security target was satisfied. An example process for using the profiles to author policies (e.g., using an algorithm described herein) is described in the description of FIG. 2.

The policy guidance module 124 tracks the authentication methods that users perform and determines whether their authentication complies with a particular security target. In some embodiments, the policy guidance module 124 generates an authentication method profile corresponding to a method that a user performed to authenticate him or herself. The policy guidance module 124 may generate the authentication method profile in substantially real time responsive to a user performing a particular authentication method. Alternatively or additionally, the policy guidance module 124 may generate one or more authentication method profiles periodically (e.g., at 11:59 PM daily) using the tracked authentication methods performed within a time period. Using this generated profile, the policy guidance module 124 may determine whether a security target was satisfied (e.g., using the third or fourth algorithm described previously). The policy guidance module 124 may perform this determination over time with each user authentication or on an aggregate of a history of tracked user authentication to generate a compliance report indicating a measure (e.g., a compliance metric) to which one or more users of the organization 120 complied with a security target during their authentication. An example process for using the profiles to analyze policies for compliance report generation is described in the description of FIG. 3.

In one example of determining whether a user's authentication complies with a security target, the policy guidance module 124 accesses information regarding the user's authentication (e.g., interactions with the client device 121) and generates an authentication method profile including the accessed information. The generation and storage of this profile enables the policy guidance module 124 to track the user's authentication. The accessed information describes a user's authentication where a security key was used. The policy guidance module 124 creates the profile having the JSON structure as shown in Table 9.

{
   "id":"03",
   "name":"security_key",
   "factors":[
   "possession",
   "inherence"
   ],
   "attributes":{
   "dedicated hardware":true,
   "proof_of_possession":true
   }
}

Table 9 Example Authentication Method Profile Created by the Policy Guidance Module If the user had used a password to prove the user's identity, this data structure would include "knowledge" in the list of values corresponding to the "factors" name. The policy guidance module 124 may use the third algorithm described previously to determine if the authentication method described by the generated profile satisfies a security target.

The policy guidance module 124 may assign scores to authentication methods. These scores may be referred to herein as "utility scores." Metrics used by the policy guidance module 124 to calculate utility scores to assign may include friction, security, and conformity, which may correspond with respective scores (e.g., a conformity score) that may be combined to determine an overall utility score. Friction, as referred to herein, refers to a measure of difficulty or lack of ease with using a given authentication method. The policy guidance module 124 may measure friction by a number of interactions a user makes with the client device 121 to perform an authentication method, the duration of time taken to perform the authentication method, user-specified metrics for evaluating friction, or a combination thereof.

The metrics governing security (e.g., from low to high) of an authentication method may be user-specified or standard-driven. For example, an authentication method corresponding to a first security key (e.g., made by a first vendor) has a security score that is different than the security score for an authentication method corresponding to a second security key (e.g., made by a second vendor). While both security keys satisfy a "possession" factor and have similar security scores simply based on their shared factor, the first security key may have been manufactured with additional security validation and had a longstanding history of not being compromised (e.g., hacked). On the contrary, the second security key may have gone through less intensive security validation and been recently developed (i.e., having insufficient evidence of whether the key could be compromised). Accordingly, an administrator may specify a security score for an authentication method involving the first security key that is higher than the score for an authentication method involving the second security key.

The policy guidance module 124 may measure conformity of an authentication method based on the relative frequency with which the method is used as compared with other methods. For example, an organization employing two authentications where the first method is used for 90% of authentications performed and the second method is used for 10%, the first method may be given a higher conformity score than is given to the second method.

Using the determined utility scores, the policy guidance module 124 may modify the output of the algorithms described herein for determining relations between authentication methods and security targets. In some embodiments, the policy guidance module 124 receives an output, from the first algorithm, of a list of authentication methods that satisfy a particular security target. The policy guidance module 124 uses the determined utility scores to determine a ranking for the list of authentication methods, where the ranking may be used to sort (e.g., on a GUI) the list of authentication methods according to the ranking (e.g., in an order from highest to lowest utility score). In this way, the policy guidance module 124 may further enable a user to author a policy that may be easier to use, more security, or more likely to be frequently used.

Figure 4A:
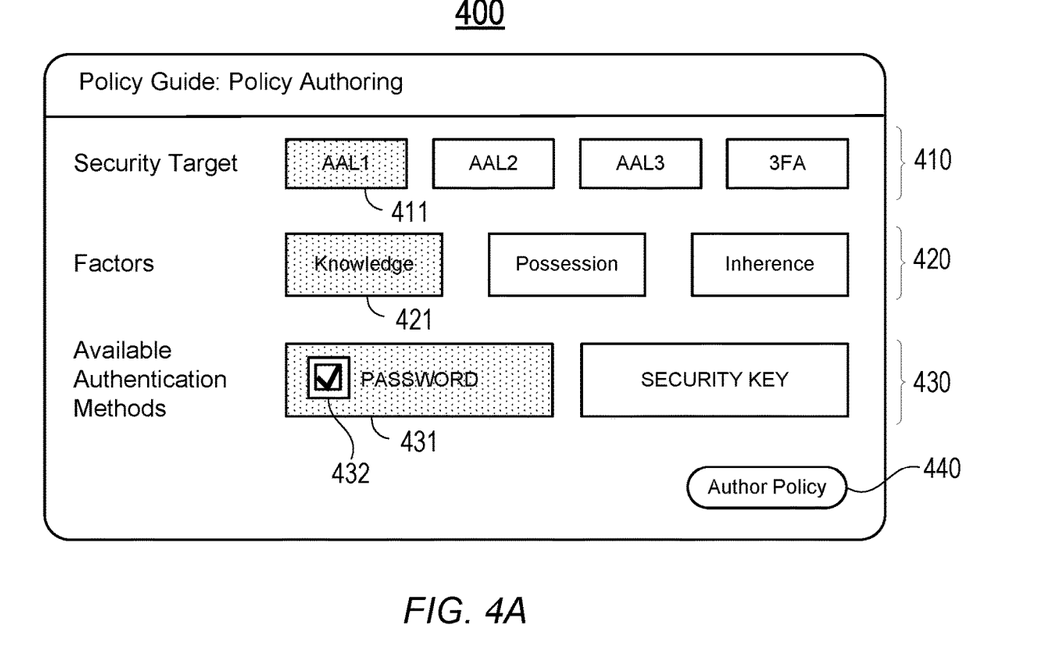
FIGS. 4A and 4B depict a graphical user interface for authoring a policy, in accordance with at least one embodiment.
Figure 4B:
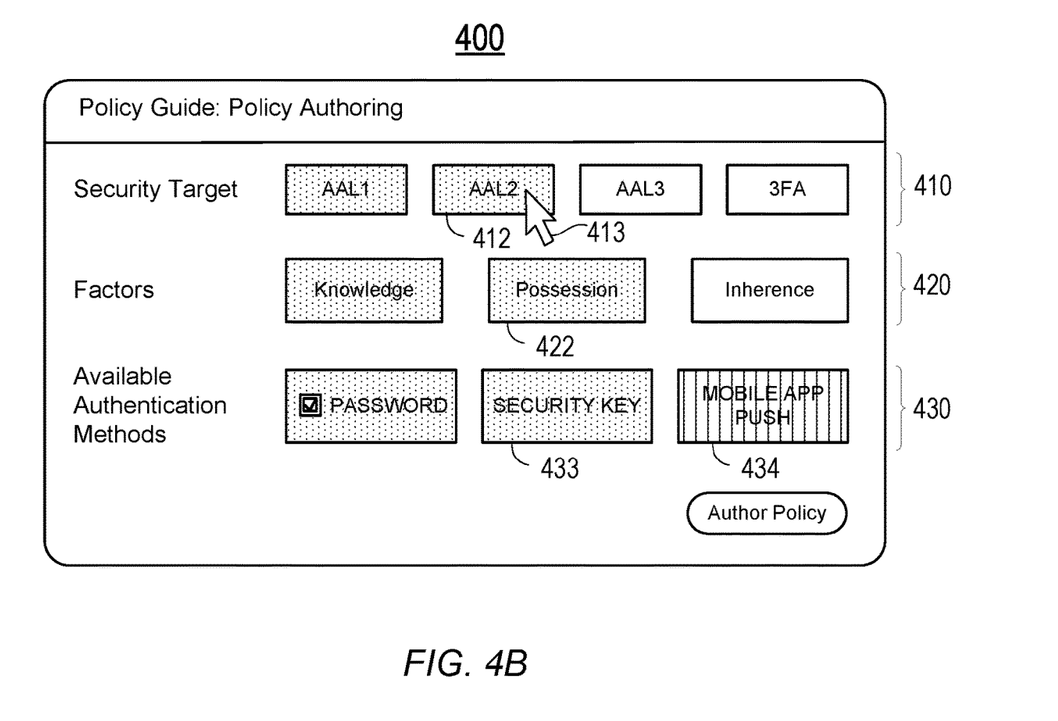
Figure 5:
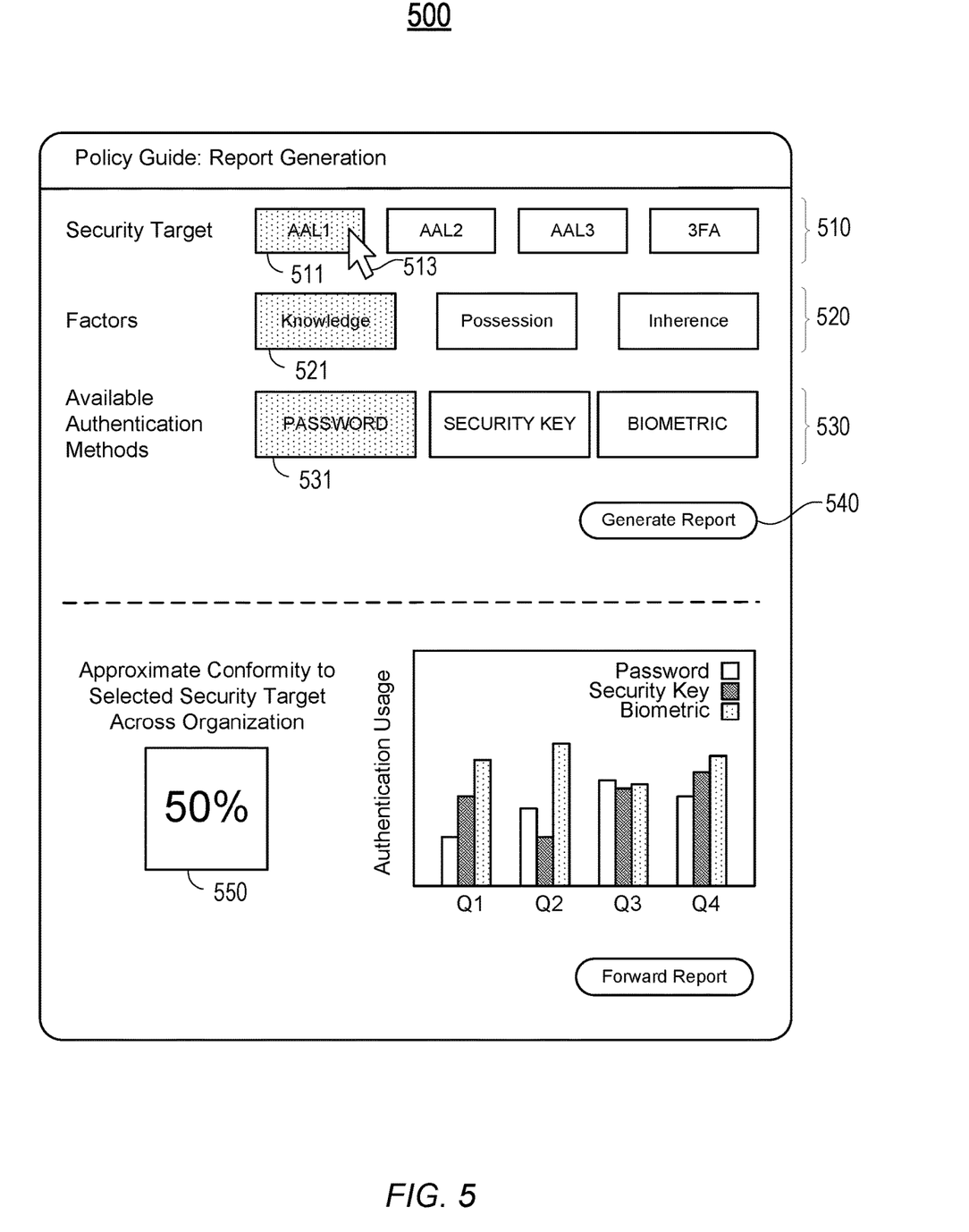
FIG. 5 depicts a graphical user interface for generating a policy compliance report, in accordance with at least one embodiment.

The policy guidance module 124 may generate or modify for display a GUI that enables easier policy authoring and analysis of authentication performance and security target compliance. Because organizations' security requirements vary, authoring a policy may range from being very straightforward (e.g., the organization can only implement password authentication) to highly complex (e.g., a national intelligence office requires many layers of identity authentication). The policy guidance module 124 provides a GUI that enables a administrator to select a desired set of security targets that the user wants to meet or select a desired set of authentication methods that the administrator wants to use. Upon receiving the administrator's selection, the policy guidance module 124 may determine a corresponding set of authentication methods or security targets that have a relationship with the administrator's selection (e.g., using one of the algorithms described previously). The policy guidance module 124 may modify the display of authentication methods based on corresponding utility scores, further assisting an administrator in authoring a policy. Examples of GUIs are depicted in FIGS. 4A, 4B, and 5.

Physically, the organization 120 is made up of a number of computing systems, including the various client devices 121; one or more internal networks that connects the computing systems, including routers or other networking devices that define the boundary between the organization and external networks; and the like.

Similarly, the IdP system 100, although depicted as a single logical system in FIG. 1, may be implemented using a number of distinct physical systems and the connections between them, such as application servers, database servers, load-balancing servers, routers, and the like.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Figure 2:
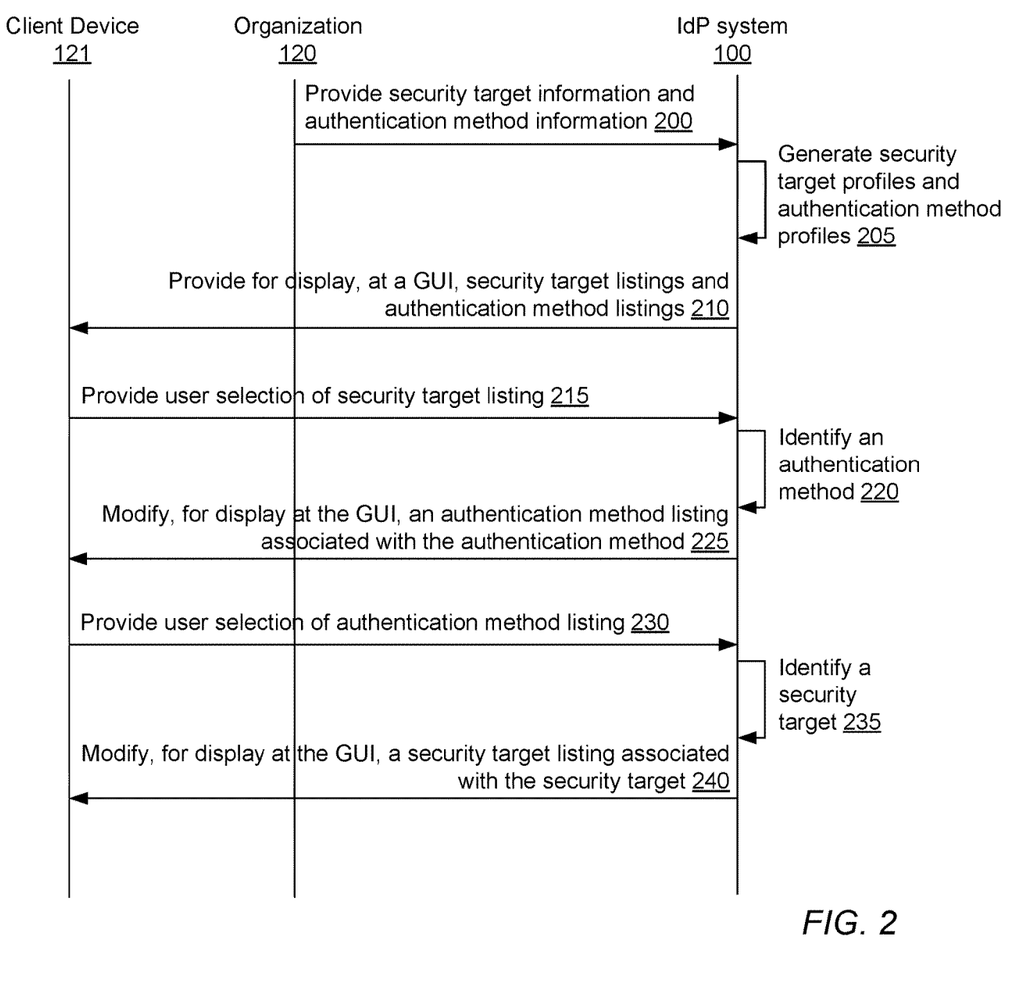
FIG. 2 illustrates interactions between a client device, an organization, and an identity provider system when authoring a policy, according to some embodiments.

FIG. 2 illustrates interactions between a client device 121, an organization 120, and an identity provider system 100 when authoring a policy, according to some embodiments. In some embodiments, the interactions illustrated in FIG. 2 involve additional, fewer, or different interactions or entities for performing the interactions. For example, the IdP system 100 may interact with the third-party application server 110 to receive additional authentication method or security target information for a user of client device 121 to authenticate his or her identity. In another example, the IdP system 100 may receive a request to generate a policy with one or more of the identified authentication method or security target. The functions performed by the IdP system 100 may be performed using a policy guidance module 124 that is stored and executed at the IdP system 100. Likewise, the policy guidance module 124 may perform the functions instead of the IdP system 100. The interactions of FIG. 2 may be facilitated by communication over the network 140.

The organization 120 provides 200 security target information and authentication method to the IdP system 100. In some embodiments, the IdP system 100 receives security target information and authentication method information from an additional or alternative source (e.g., a third-party application server 110). The received security target information may be indicative of a mapping of security targets to authentication attributes and/or factors. For example, the IdP system 100 receives information describing AAL1 which indicates that the security target requires at least single-factor authentication. The received authentication method information may be indicative of a mapping of authentication methods to authentication attributes and/or factors. For example, the authentication method corresponding to a security key indicates the security key method is mapped to a required factor of "possession," an optional factor of "inherence," required attributes of "dedicated hardware" and "proof of possession," and optional attributes of "verifier impersonation resistance."

The IdP system 100 generates 205 security target profiles and authentication method profiles. One of the security target profiles may be associated with a particular subset of the total authentication attributes provided 200. One of the authentication target profiles may also be associated with the particular subset of authentication attributes. For example, the security target profile may specify a two-factor authentication where a password length must be a minimum of twelve characters and the user must provide proof of possession (e.g., using a security token). The authentication method may specify that a user is required to authenticate using a password of at least twelve characters and using a security token. In this example, a relationship between the authentication method and the security target can be identified by at least the match between attributes. The security target may be fully satisfied by the authentication method if the security target requires no more than two factors, since a password provides a knowledge factor and the token provides a possession factor. The IdP system 100 may determine a relationship between the authentication method and security target through identification 220 or 235.

The IdP system 100 provides 210 for display, at a GUI at client device 121, security target listings and authentication method listings 210. Each displayed security target listing may correspond with a generated 205 security target profile. Each displayed authentication method listing may correspond with a generated 205 authentication method profile. The IdP system 100 may choose to display a subset of security target or authentication method listings. The listings may be displayed at once (e.g., as icons in a grid) or in an incremental fashion (e.g., a scrollable menu of the listings). Each listing displayed may be modified by the IdP system 100 (e.g., the modification 225 or 240).

The listings may be selectable by an administrator. For example, the administrator may select one or more authentication method listings to request that the IdP system 100 determine a security target listing met by the selected listings. The term "user selection" used within the context of making a selection on the GUIs described herein refers to a selection made by an administrator unless otherwise indicated by the context in which the term is used. Similar, a "user" interacting with the GUIs (e.g., making a selection) as described herein refers to an administrator and not necessarily a user who is obligated to authenticate himself through an authored policy. One example of this is described through the providing 230, the identifying 235, and the modifying 240.

The client device 121 provides 215 a user selection of a security target listing to the IdP system 100. For example, a user may select a security target listing on the GUI for the security target of "AAL1." The IdP system 100 may proceed to identify 220 an authentication method having a relationship with the selected security target listing and modify 225 the authentication method listing on the GUI to indicate the presence of the relationship to the user. In another example, a user may select multiple security target listings corresponding to a requirement that the organization 120 meet several security targets (e.g., the organization is in the field of national intelligence). The IdP system 100 may then proceed to identify 220 authentication methods having relationships with the selected security target listings and modifying 225 the corresponding authentication method listings. In some embodiments, the IdP system 100 may receive a user selection of a GUI element (e.g., a security target listing, authentication method listing, etc.) from the client device 121 by way of data provided by the client device 121 that indicates the user's selection.

The IdP system 100 identifies 220 an authentication method. The IdP system 100 may use the algorithms described in the description of the policy guidance module 124 for determining relationships between authentication methods and security targets. The IdP system 100 may use the security target profile corresponding to the user-selected security target listing and generated 205 authentication method profiles, including the profile of the identified 220 authentication method, to determine that the authentication method satisfies the security target (e.g., required number of factors and required attributes satisfied).

The IdP system 100 modifies 225, for display at the GUI, an authentication method listing associated with the identified 220 authentication method. With the authentication method identified 220, the IdP system 100 modifies 225 the corresponding listing to indicate to the user of the client device 121 that there is a relationship between the authentication method and the selected security target. In particular, the relationship indicates that the authentication method satisfies the security target. The IdP system 100 may modify the display of the authentication method listing at the GUI by changing the size of the displayed listing relative to other displayed listings, highlighting the listing, changing the font type, bolding the font of the listing, generating a special icon to overlay on the listing, any suitable visual distinction that differentiates the authentication method listing from others that do not share a relationship with the selected security target listing, or a combination thereof.

The client device 121 provides 230 a user selection of an authentication method listing. The authentication method listing may be different than the listing modified 225 for display by the IdP system 100. In an example where the user selects the authentication method listing before listing the security target listing provided 215 or where the authentication method listing displayed has not been modified yet, the IdP system 100 may proceed to identify a relationship between the authentication method corresponding to the selected listing and a security target. In some embodiments, a user selection of a listing that has been modified for display may cause the IdP system 100 to further modify the display of the listing to return it to a state prior to modification (e.g., not highlighted, default icon size, default font size, etc.).

In one example, a user selection provided user be of an authentication method listing on the GUI for the method of "password." The IdP system 100 may proceed to identify 235 a security target having a relationship with the selected authentication method listing and modify 240 the security target listing on the GUI to indicate the presence of the relationship to the user. In another example, a user may select multiple authentication method listings and the IdP system 100 may then proceed to identify 235 security targets having relationships with the selected authentication method listings and modifying 240 the corresponding security target listings. In some embodiments, the policy guidance module 240 may determine that two or more security targets have relationships with selected authentication methods and determine the security target that is the most secure out of the two or more security targets (e.g., using determined security scores reflective of security rankings as determined by industry standards).

The IdP system 100 identifies 235 a security target. The IdP system 100 may use the algorithms described in the description of the policy guidance module 124 for determining relationships between authentication methods and security targets. The IdP system 100 may use the authentication method profile corresponding to the user-selected authentication method listing and generated 205 security target profiles, including the profile of the identified 235 security target, to determine that the security target is satisfied by the selected authentication method (e.g., required number of factors and required attributes satisfied).

The IdP system 100 modifies 240, for display at the GUI, a security target listing associated with the identified 235 security target. With the security target identified 235, the IdP system 100 modifies 240 the corresponding listing to indicate to the user of the client device 121 that there is a relationship between the security target and the selected authentication method. The IdP system 100 may modify the display of the security target listing at the GUI by changing the size of the displayed listing relative to other displayed listings, highlighting the listing, changing the font type, bolding the font of the listing, generating a special icon to overlay on the listing, any suitable visual distinction that differentiates the security target listing from others that do not share a relationship with the selected authentication method listing, or a combination thereof.

Figure 3:
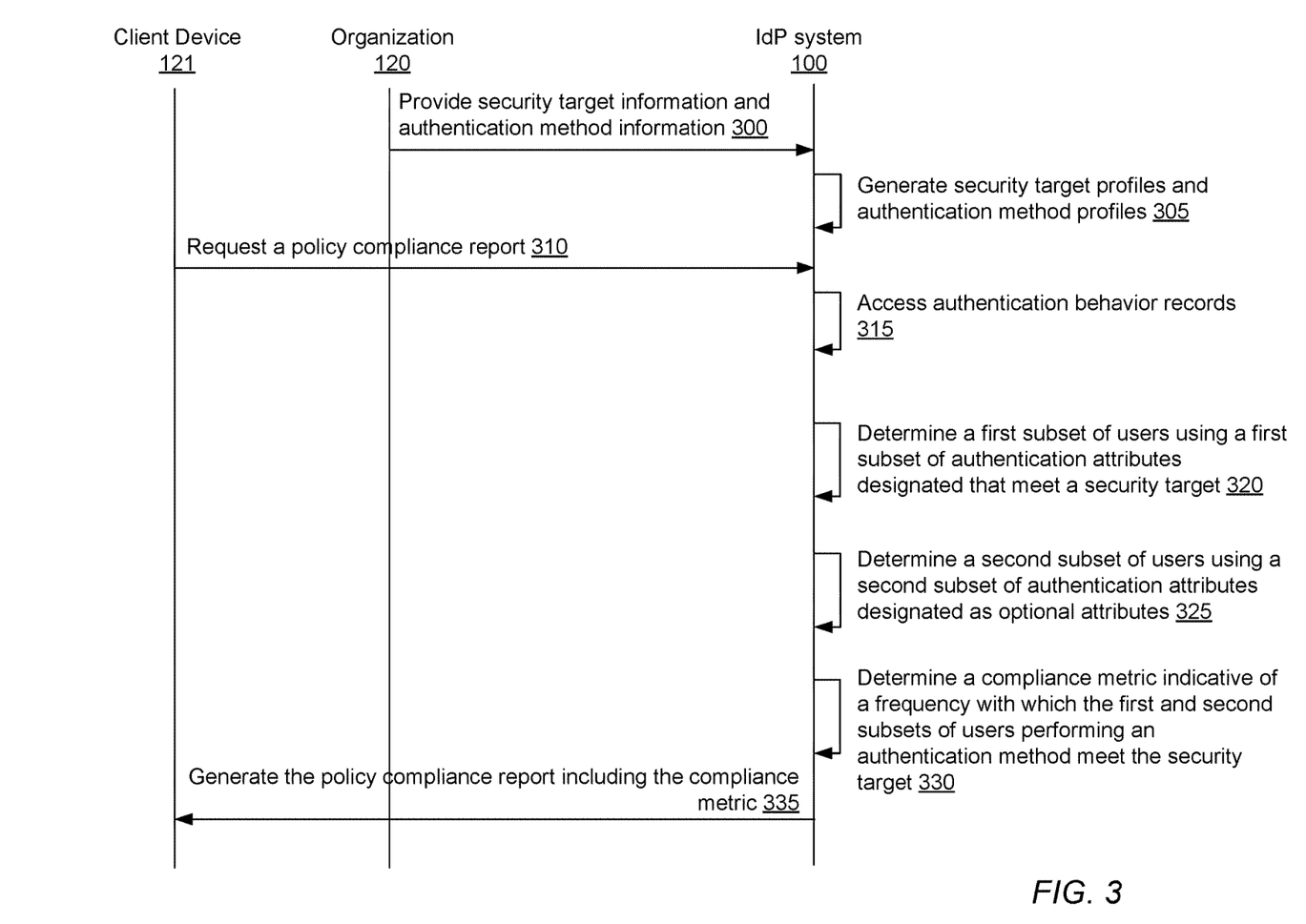
FIG. 3 illustrates interactions between a client device, an organization, and an identity provider system when generating a policy compliance report, according to some embodiments.

FIG. 3 illustrates interactions between a client device 121, an organization 120, and an identity provider system 100 when generating a policy compliance report, according to some embodiments. In some embodiments, the interactions illustrated in FIG. 3 involve additional, fewer, or different interactions or entities for performing the interactions. For example, the IdP system 100 may, in addition to or as an alternative to accessing 315 authentication behavior records, continue generating authentication method profiles for authentication performed subsequent to the request 310 to be included within the policy compliance report. In some embodiments, the functions performed by the IdP system 100 may be performed using a policy guidance module 124 that is stored and executed at the client device 121. The interactions of FIG. 3 may be facilitated by communication over the network 140.

The organization 120 provides 300 security target information and authentication method information to the IdP system 100. As described with respect to the providing 200 function of FIG. 2, the IdP system 100 may receive security target information and authentication method information from an additional or alternative source (e.g., a third-party application server 110). The received security target information may be indicative of a mapping of security targets to authentication attributes and/or factors. The received authentication method information may be indicative of a mapping of authentication methods to authentication attributes and/or factors.

The IdP system 100 generates 305 security target profiles and authentication method profiles. One of the generated 305 security target profiles may include a first subset of authentication attributes. For example, the security target profile for AAL2 indicates that required attributes include dedicated hardware, proof of possession, and verifier impersonation resistance. One of the generated 305 authentication method profiles may include both the first subset of authentication attributes and a second subset, different from the first. In particular, the second subset is designated as optional attributes within the authentication method profile for the particular authentication method. That is, a user may perform the authentication method associated with the authentication method profile using either the first subset of attributes or the second subset of attributes. For example, the second subset of attributes may indicate that a password of minimum length twelve characters is optional.

The client device 121 requests 310 a policy compliance report. The request may include user-specified constraints for the report to be generated against. For example, the user of the client device 121 may specify a set of users of the organization 120 for which the compliance report should outline their compliance to particular security targets. In another example, the user may specify a time range for which the compliance report should outline how users complied with particular security targets during the time range (e.g., a year, a month, etc.). Accordingly, the IdP system 100 may filter the data (e.g., the authentication method profiles) accessed 315 to generate the report. In yet another example, the user may specify a security target for which the user desires authentication methods that meet the specified security target.

The IdP system 100 accesses 315 authentication behavior records. The authentication behavior records may be associated with users of an organization (e.g., the organization 120) and indicate that they have performed a particular authentication method associated with a generated authentication profile. In some embodiments, the records may be structured in the form of authentication method profiles. The IdP system 100 may access 315 the records from an internal database such as the user data 101 or may receive the records from a third-party application server 110. The IdP system 100 may access all available data or a filtered subset of the data (e.g., based on the request 310 received from the client device 121). For example, the IdP system 100 may access authentication method profiles from the past ninety days or from a specific group of users of the organization 120.

The IdP system 100 determines 320 a first subset of users using a first subset of authentication attributes that meet a security target. The IdP system 100 may use the accessed 315 authentication behavior records and the generated 305 security profiles to determine 320 the first subset of users. For example, using the third or fourth algorithm described with respect to the policy guidance module 124, the IdP system 100 may determine whether the authentication methods within the accessed 315 authentication behavior records satisfy a particular security target (e.g., user-specified). The IdP system 100 may determine, from the authentication behavior records, the users performing the authentication methods that satisfy the particular security target. For example, the security target is associated with the first subset of the authentication attributes and the IdP system 100 determines the users that authenticate using the first subset of authentication attributes.

The IdP system 100 determines 325 a second subset of users using a second subset of authentication attributes. The IdP system 100 may determine, based on the authentication behavior records, the users that authenticate using the second subset of authentication attributes (e.g. a password). These users (i.e., the second subset of users) may have used the second subset of authentication attributes, which were designated as optional in an authentication method profile, instead of the first subset of authentication attributes, which were designated as required. For example, users of the organization may be required to use the first subset of attributes when initially logging into their client devices, but once the initial login has been performed, have the option of using the second subset of attributes to authenticate instead.

The IdP system 100 determines 330 a compliance metric indicative of a frequency with which the first and second subsets of users performing an authentication method meet the security target. The compliance metric may be a ratio of the number of the first subset of users to number of the second subset of users. In some embodiments, the compliance metric may indicate the percentage of users compliant with a security target as compared to the users of the organization as a whole. The IdP system 100 may determine how the compliance metric changes over time, location, user title, or any suitable parameter relevant to the operation of an organization.

The IdP system 100 generates 335 the policy compliance report that includes the compliance metric. The IdP system 100 may generate 335 the report on the client device 121 through a GUI. The policy compliance report may include the determined 330 compliance metric. In some embodiments, the IdP system 100 may generate one or more visual aids based on the determined 330 compliance metrics to be included in the generated 335 report. An example of a GUI with a policy compliance report is shown in FIG. 5.

FIGS. 4A and 4B depict a GUI 400 for authoring a policy, in accordance with at least one embodiment. FIG. 4A depicts the GUI 400 with an initial selection of an authentication method listing and FIG. 4B depicts the GUI 400 at a later time with a subsequent selection of a security target listing.

The GUI 400 includes security target listings 410, factor listings 420, authentication method listings 430, and author policy button 440. The GUI 400 may be provided for display at the client device 121 by the policy guidance module 124 at the IdP system 100 or by a policy guidance module hosted on the client device 121. The listings 410, 420, and 430 and the button 440 may be selectable by a user. Each security target listing may correspond to a security target profile and each authentication method listing may correspond to an authentication method profile. The authentication method listings 430 may correspond to the authentication methods available to the organization. In some embodiments, the policy guidance module 124 may organize the authentication method listings 430 based on utility scores determined by the policy guidance module 124 for each of the authentication methods.

As shown in FIG. 4A, a user has selected the authentication method listing 431 corresponding to a method of using a password to authenticate. An indicator 432 reflects the user's selection of the authentication method listing 431. Upon receiving the user's selection of the authentication method listing 431, the policy guidance module 124 determines that the security target AAL1 is satisfied by the selected authentication method and that the factor of "knowledge" is provided by the selected authentication method. Accordingly, the policy guidance module 124 modifies the GUI 400 to display the security target listing 411 in a visually distinguishing manner (e.g., highlighted). Additionally, the policy guidance module 124 modifies the display of the factor listing 421 and the authentication method listing 431 to indicate to the user that the set of visually distinguished listings have a relationship among them. With the listings visually distinguished, the user may select the author policy button 440 to request that the policy guidance module 124 generate an authentication policy based on the visually distinguished icons.

As shown in FIG. 4B, a user has further selected, using a cursor 413, the security target listing 412 of the security target listings 410, which corresponds to the AAL2 security target. The policy guidance module 124 determines that an addition of the security key authentication method with the existing selection of the password authentication method satisfies the security target requirements for the AAL2 security target. This determination may be made, for example, using the first algorithm described with respect to the policy guidance module 124 which determines authentication methods that satisfy a selected security target. Responsive to that determination, the policy guidance module 124 may cause the display of the authentication method listing 433 to be visually distinguished from other authentication method listings that do not have a relationship with either security targets AAL1 or AAL2. The policy guidance module 124 may also visually distinguish the factor listing 422 corresponding to "possession" because the addition of the security key authentication method provides the "possession" factor.

In some embodiments, the policy guidance module 124 may determine and provide for display authentication method listings for authentication methods that may not be available to the organization yet. For example, as shown in FIG. 4B, the authentication method listing 434 for push notifications on a mobile application appears. The policy guidance module 124 may use the security target profile of the selected AAL2 security target, authentication method profiles, and the second algorithm, as described in the description of policy guidance module 124, to determine authentication methods that satisfy AAL2. The determined methods may include "Mobile App Push," which may not be available to the organization yet. The policy guidance module 124 may generate the authentication method listing 434 in a visually distinguishing manner that further distinguishes it from other listings. In this way, the policy guidance module 124 may indicate to a user that push notifications is not available to the organization but is an optional authentication attribute that may be used to satisfy the AAL2 security target.

FIG. 5 depicts a GUI 500 for generating a policy compliance report, in accordance with at least one embodiment. The GUI 500 includes security target listings 510, factor listings 520, authentication method listings 530, and generate report button 540. The GUI 500 may be provided for display at the client device 121 by the policy guidance module 124 at the IdP system 100 or by a policy guidance module hosted on the client device 121. The listings 510, 520, and 530 and the button 540 may be selectable by a user. Each security target listing may correspond to a security target profile and each authentication method listing may correspond to an authentication method profile. The authentication method listings 530 may correspond to the authentication methods available to the organization. In some embodiments, the policy guidance module 124 may organize the authentication method listings 430 based on utility scores determined by the policy guidance module 124 for each of the authentication methods.

As shown in FIG. 5, a user has selected the security target listing 511 using a cursor 513. The policy guidance module 124 receives the user's selection and determines that the password authentication method, which is associated with the knowledge factor, has a relationship with the security target AAL1 of the security target listing 511. The user may select the generate report button 540 to request that the policy guidance module 124 generate a compliance report showing how users of an organization complied with security target AAL 1. The policy guidance module 124 may determine a compliance metric using a process as described in FIG. 3, accessing the authentication behavior records of users and determining which users authenticated in a manner that complies with AAL1 (e.g., using a password). The policy guidance module 124 may determine the value of the compliance metric to be 50%, indicating that half of an organization's users authenticate in a manner that satisfies the requirements of the selected security target, AAL1.

Figure 6:
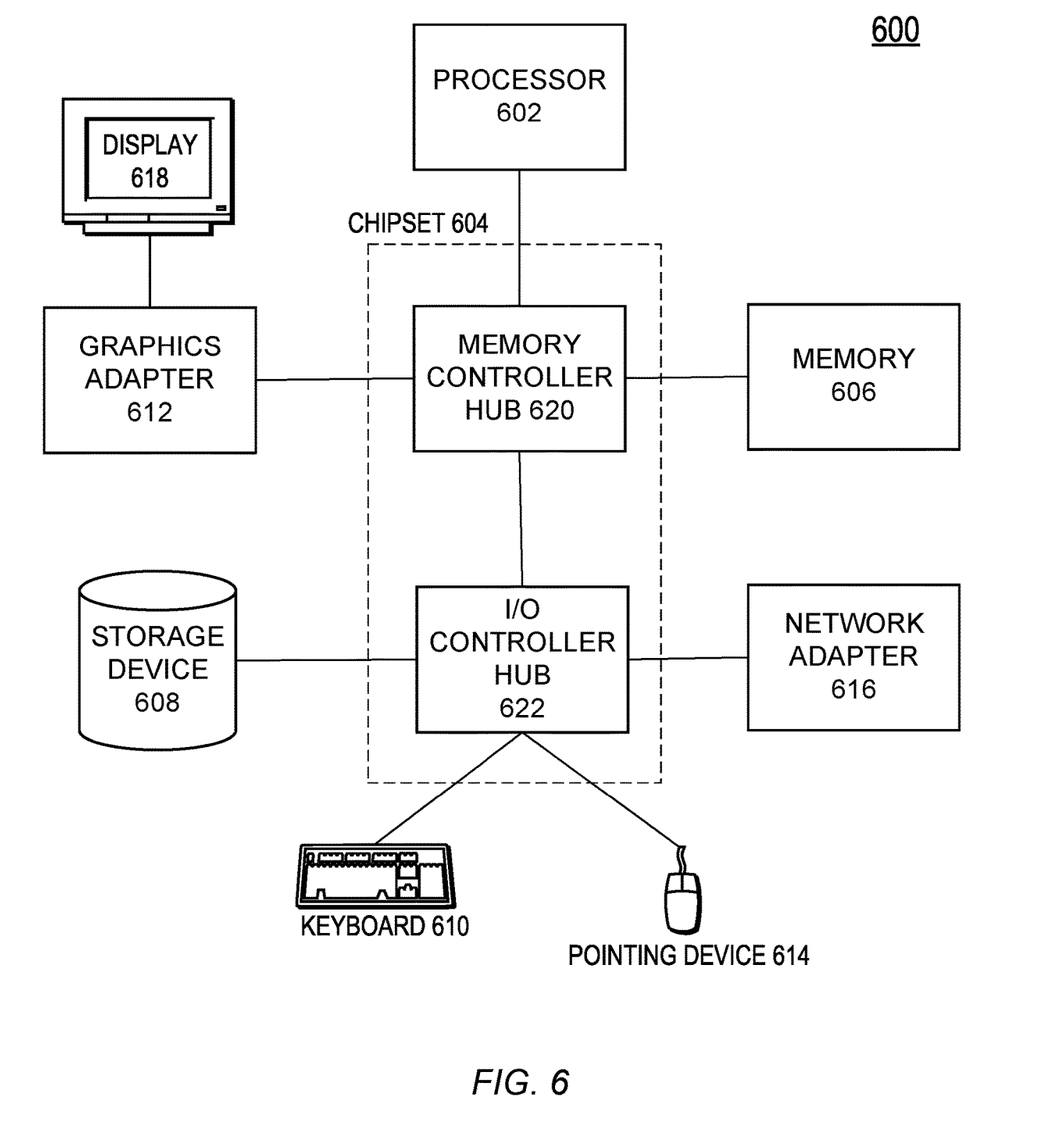
FIG. 6 is a high-level block diagram illustrating physical components of a computer used as part or all of (for example) the identity provider system, the client device, and/or the third-party application server of FIG. 1, according to one embodiment.

FIG. 6 is a high-level block diagram illustrating physical components of a computer 600 used as part or all of (for example) the identity provider 100, the client device 121, and/or the third-party application server 110, according to one embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 acting as a server may lack a graphics adapter 612, and/or display 618, as well as a keyboard 610 or pointing device 614. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for determining an authentication policy used to authenticate a client device to an identity provider server, the method comprising:
   receiving security target information indicative of a mapping of a plurality of security targets to a plurality of authentication attributes;
   receiving authentication method information indicative of a mapping of a plurality of authentication methods to one or more of the plurality of authentication attributes;
   generating a plurality of security target profiles using the received security target information, a security target profile of a security target associated with a subset of the plurality of authentication attributes;
   generating a plurality of authentication method profiles using the received authentication method information, an authentication method profile of an authentication method associated with the subset of the plurality of authentication attributes;
   providing for display within a graphical user interface (GUI):
      a plurality of security target listings corresponding to the plurality of security targets, and
      a plurality of authentication method listings corresponding to the plurality of authentication methods;
   in response to receiving a user selection of a security target listing associated with the security target:
      identifying the authentication method using the security target profile and the authentication method profile, and
      modifying for display within the GUI an authentication method listing associated with the authentication method; and
   in response to receiving a user selection of the authentication method listing associated with the authentication method:
      identifying the security target using the authentication method profile and the security target profile, and
      modifying the security target listing for display within the GUI.

2. The computer-implemented method of claim 1, further comprising assigning a plurality of utility scores to the plurality of authentication methods.

3. The computer-implemented method of claim 2, wherein assigning the plurality of utility scores to the plurality of authentication methods comprises:
   determining a number of interactions made by a user to perform a given authentication method of the plurality of authentication methods; and
   assigning, based on the number of interactions, a utility score to the given authentication method.

4. The computer-implemented method of claim 2, wherein assigning the plurality of utility scores to respective authentication methods comprises:
   receiving respective user-specified attribute security scores for a required attribute of a given authentication method and an optional attribute of the given authentication method; and
   calculating a utility score for the given authentication method based on the respective user-specified attribute security scores.

5. The computer-implemented method of claim 2, wherein assigning the plurality of utility scores to respective authentication methods comprises:
  accessing authentication behavior records indicating that a plurality of users performed a given authentication method;
  determining, based on the authentication behavior records, a subset of the plurality of users performing the given authentication method; and
  calculating a utility score for the given authentication method based on the determined subset of the plurality of users.

6. The computer-implemented method of claim 2, further comprising, in response to receiving the user selection of the security target listing associated with the security target:
  determining a subset of authentication methods that meet the security target;
  ranking the subset based on respective utility scores of the subset of authentication methods; and
  modifying, based on the ranking, for display at the GUI the plurality of authentication method listings corresponding to the plurality of authentication methods.

7. The computer-implemented method of claim 6, wherein modifying, based on the ranking, for display at the GUI the plurality of authentication method listings corresponding to the plurality of authentication methods comprises providing for display within the GUI the plurality of authentication method listings in a plurality of sizes corresponding to the ranking.

8. The computer-implemented method of claim 1, further comprising, in response to receiving the user selection of the security target listing associated with the security target:
  determining that the identified authentication method is unavailable to an organization, wherein the authentication method listing is displayed within the GUI in a manner that visually distinguishes the authentication method listing from a subset of authentication method listings corresponding to available authentication methods of the plurality of authentication methods.

9. The computer-implemented method of claim 1, wherein generating the plurality of security target profiles comprises generating a plurality of respective security target data structures, a data structure of the plurality of respective security target data structures comprising a number corresponding to a required number of factors, a list of required attributes, and a list of attribute conditions corresponding to the list of required attributes.

10. The computer-implemented method of claim 1, wherein generating the plurality of authentication method profiles comprises generating a plurality of respective authentication method data structures, a data structure of the plurality of respective authentication method data structures comprising an identification number, an authentication method name, an enable status, a list of required factors, a list of optional factors, a list of required attributes, and a list of optional attributes.

11. The computer-implemented method of claim 1, wherein identifying, the authentication method using the security target profile and the authentication method profile comprises:
  generating a plurality of authentication method combinations using the plurality of authentication methods, wherein each combination comprises a respective set of factors and a respective set of attributes, wherein the plurality of authentication method combinations includes the authentication method; and
  for each combination of the plurality of authentication combinations:
    determining whether the set of factors of the combination satisfies a required number of factors indicated by the security target profile,
    determining whether the set of attributes of the combination satisfies a list of required attributes indicated by the security target profile, and
    responsive to determining that both the required number of factors and the list of required attributes are not satisfied by the combination, removing the combination from the plurality of authentication method combinations; and
  determining that a plurality of remaining authentication combinations satisfy both the required number of factors and the list of required attributes are satisfied, the plurality of remaining authentication combinations including the authentication method.

12. The computer-implemented method of claim 1, wherein identifying, the authentication method using the security target profile and the authentication method profile comprises:
  generating a plurality of authentication method combinations using the plurality of authentication methods, wherein each combination comprises respective sets of required factors, optional factors, required attributes, and optional attributes, wherein the plurality of authentication method combinations includes the authentication method;
  for each combination of the plurality of authentication combinations:
    determining whether a sum of the set of required factors and the set of optional factors of the combination satisfies a required number of factors indicated by the security target profile,
    determining whether the set of required attributes and the set of optional attributes of the combination collectively satisify a list of required attributes indicated by the security target profile, and
    responsive to determining that both the required number of factors and the list of required attributes are not satisfied by the combination, removing the combination from the plurality of authentication method combinations; and
  determining that a plurality of remaining authentication combinations satisfy both the required number of factors and the list of required attributes are satisfied, the plurality of remaining authentication combinations including the authentication method.

13. The computer-implemented method of claim 1, wherein identifying the security target using the authentication method profile and the security target profile comprises:
  receiving a user-specified list of authentication methods, wherein the user selection of the authentication method listing causes the authentication method to be included in the user-specified list;
  determining whether a total number of unique required factors indicated by the user-specified list satisfies a required number of factors indicated by the security target profile;
  determining whether a total number of unique required attributes indicated by the user-specified list satisfies a list of required attributes indicated by the security target profile; and
  responsive to determining that both the required number of factors and the list of required attributes are satisfied by the user-specified list, identifying the security target.

14. The computer-implemented method of claim 1, wherein identifying the security target using the authentication method profile and the security target profile comprises:
receiving a user-specified list of authentication methods, wherein the user selection of the authentication method listing causes the authentication method to be included in the user-specified list;
determining whether a total number of unique required factors and unique optional factors indicated by the user-specified list satisfies a required number of factors indicated by the security target profile;
determining whether a total number of unique required attributes and unique optional attributes indicated by the user-specified list satisfies a list of required attributes indicated by the security target profile; and
responsive to determining that both the required number of factors and the list of required attributes are satisfied by the user-specified list, identifying the security target.

15. The computer-implemented method of claim 1, wherein modifying for display at the GUI the authentication method listing associated with the authentication method comprises visually distinguishing for display at the GUI the authentication method listing.

16. The computer-implemented method of claim 1, wherein the plurality of security targets comprise one or more of an authenticator assurance level 1 (AAL1), AAL2, or AAL3.

17. The computer-implemented method of claim 1, wherein the plurality of authentication attributes corresponds to one or more of a password, a biometric, or a security token.

18. The computer-implemented method of claim 1, wherein the user selection is a first user selection, further comprising, in response to receiving the first user selection of the security target listing associated with the security target:
receiving a second user selection of the authentication method listing; and
generating the authentication policy comprising the security target and the authentication method.

19. A non-transitory computer-readable storage medium storing instructions, the instructions when executed by a processor, cause the processor to perform the actions comprising:
receiving security target information indicative of a mapping of a plurality of security targets to a plurality of authentication attributes;
receiving authentication method information indicative of a mapping of a plurality of authentication methods to one or more of the plurality of authentication attributes;
generating a plurality of security target profiles using the received security target information, a security target profile of a security target associated with a subset of the plurality of authentication attributes;
generating a plurality of authentication method profiles using the received authentication method information, an authentication method profile of an authentication method associated with the subset of the plurality of authentication attributes;
providing for display within a graphical user interface (GUI):
a plurality of security target listings corresponding to the plurality of security target, and
a plurality of authentication method listings corresponding to the plurality of authentication methods;
in response to receiving a user selection of a security target listing associated with the security target:
identifying, the authentication method using the security target profile and the authentication method profile, and
modifying for display within the GUI an authentication method listing associated with the authentication method; and
in response to receiving a user selection of the authentication method listing associated with the authentication method:
identifying the security target using the authentication method profile and the security target profile, and
modifying the security target listing for display within the GUI.

20. A method generating a policy compliance report, the method comprising:
receiving security target information indicative of a mapping of a plurality of security targets to a plurality of authentication attributes;
receiving authentication method information indicative of a mapping of a plurality of authentication methods to one or more of the plurality of authentication attributes;
generating a security target profile of a security target associated with a first subset of the plurality of authentication attributes;
generating an authentication method profile of an authentication method, the authentication method profile comprising the first subset of the plurality of authentication attributes and a second subset of the plurality of authentication attributes, wherein the second subset of the plurality of authentication attributes is designated as optional authentication attributes for the authentication method;
receiving a request to generate a policy compliance report;
accessing authentication behavior records associated with a plurality of users performing the authentication method;
determining, based on the authentication behavior records and the security target profile:
a first subset of the plurality of users using the first subset of the plurality of authentication attributes that meet the security target, and
a second subset of the plurality of users using the second subset of the plurality of authentication attributes;
determining a compliance metric indicative of a frequency with which performance of the authentication method by the first and second subsets of the plurality of users meets the security target; and
generating the policy compliance report comprising the compliance metric.

* * * * *